(Model.)
H. B. SCOVILLE.
DISH WASHING MACHINE.
No. 337,875. Patented Mar. 16, 1886.
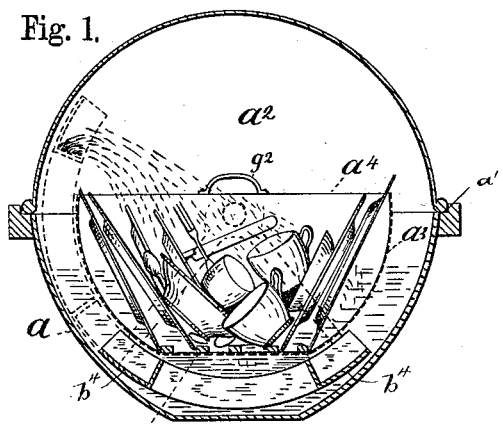
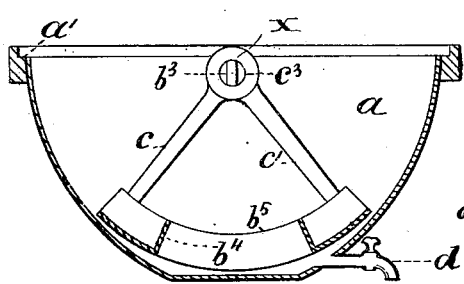
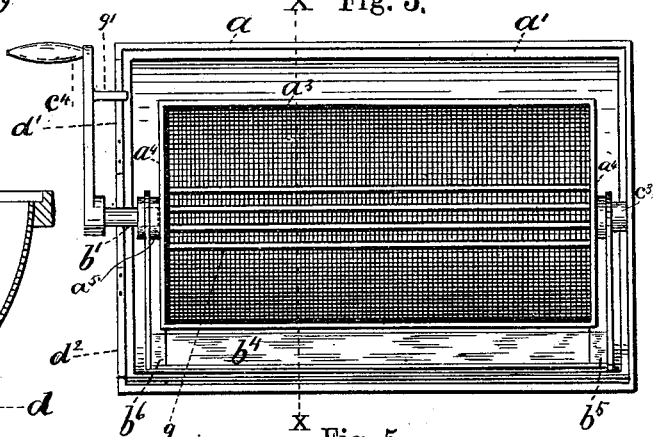
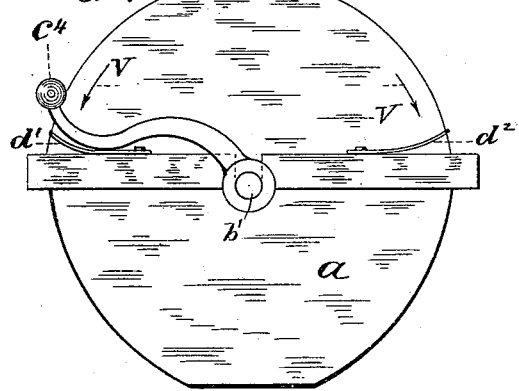
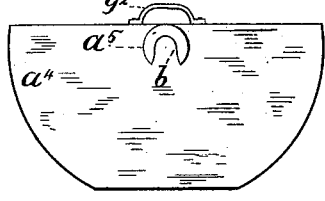
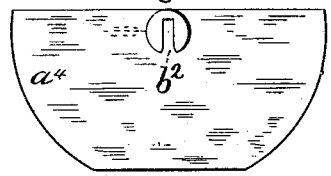
Witnesses.
Amos W. Sangster,
Jennie M. Caldwell.
Inventor.
Horace B. Scoville
By James Sangster
atty.

UNITED STATES PATENT OFFICE.

HORACE B. SCOVILLE, OF AUSTINBURG, OHIO.

DISH-WASHING MACHINE.

SPECIFICATION forming part of Letters Patent No. 337,675, dated March 16, 1886.

Application filed January 7, 1885. Serial No. 152,197. (Model.)

*To all whom it may concern:*

Be it known that I, HORACE B. SCOVILLE, a citizen of the United States, residing in Austinburg, in the county of Ashtabula and State of Ohio, have invented certain new and useful Improvements in Dish-Washing Machines, of which the following is a specification.

The object of my invention is to provide a simple and convenient means for washing dishes or other equivalent articles, all of which will be fully and clearly hereinafter shown, described, and claimed.

In the accompanying drawings, Figure 1 is a vertical cross-section through line X X, Fig. 3. Fig. 2 is an inside view of the end of the vessel for holding the hot water, showing the device for holding the wire-screen basket stationary. Fig. 3 is a top view of the device complete, except the cover. Fig. 4 is an end view of the machine. Fig. 5 represents an outside end view of the wire-screen basket, showing the means by which it is connected to the bucket-shaft and by which it is suspended in the water-vessel; and Fig. 6 represents the opposite end of the same, showing the device for preventing it from turning while in place.

The water-vessel $a$ is usually made of galvanized iron, but any other suitable material may be used. It is made in the form of a semicircle, or substantially so, having a flat bottom, and is provided with a groove or depression, $a'$, to receive the cover $a^2$. The cover is made of the same material, and its edges are wired or otherwise made so as to give it sufficient stiffness. The basket $a^3$ is formed of galvanized wire-cloth with solid ends $a^4$, to which are attached in any well-known way the devices for holding it in place within the water-vessel, so as to keep it from turning. (See Figs. 5 and 6, in which Fig. 5 shows a slotted disk, $a^5$, having a slot, $b$, the upper part of which is semicircular, as shown, thereby adapting it to rest upon the inner end of the crank-shaft $b'$.) The slot $b^2$ on the opposite end (see Fig. 6) is a narrow square-topped slot adapted to slide down over and closely fit a correspondingly-shaped projection, $b^3$, at the inner end of a cylindrical bearing or lug, $c^3$, fixedly secured to the upper edge of the end of the water-vessel $a$, as clearly shown in Figs. 2 and 3. The buckets move independently of the basket, (which, as will be seen, remains stationary,) and they are made of the two angular plates $b^4$, and run nearly the whole length of the water-vessel, and are connected with the two segments $b^5$ $b^6$, having arms $c$ $c'$, which meet at a common center, forming the bucket-frame, the arms at one end of the bucket-frame being connected rigidly to the shaft $b'$, having its bearing in a recess or notch in the upper edge of the adjacent end of the vessel $a$, (see Fig. 3,) while the arms at the opposite end of the bucket-frame terminate at their upper end in an enlargement, $x$, Fig. 2, provided with a circular opening, into which fits the inwardly-projecting lug $c^3$ when the bucket-frame is in its normal position.

$C^4$ represents the crank and handle, which are made in the usual way.

From the construction set forth it will be seen that the basket may readily be removed by raising it from off its bearings, and that by lifting the shaft $b'$ out of the notch in the end of the water-vessel and moving the bucket-frame longitudinally in the direction of the arrow, Fig. 3, until the lug $c^3$ has been cleared, the bucket-frame may also be removed.

The operation of the invention is as follows: The dishes being placed in the basket in any suitable way—similar to that shown in Fig. 1, for instance—the crank-handle is now vibrated back and forth in the direction of the arrow V, which operation throws the hot water first on one side of the basket, then on the other, alternately dashing it on each side of the articles to be washed. The buckets are alternately lifted slightly above the basket. After the operation has been performed for a short time—not to exceed a minute or two—the articles are all thoroughly cleaned, and by drawing the water off through the stop-cock $d$, fresh hot water may be now added to rinse them, and drawn off, as before. The cover may now be removed, and the dishes, (or other articles,) being hot, will all be dry in a few minutes.

The water-vessel is provided at one end on opposite sides with the spring-stops $d'$ $d^2$, so arranged that the operating-handle will strike one of said stops at the limit of each alternate movement and be thereby suddenly arrested, thus throwing the water in the buckets with great force on and against the dishes. These spring-stops also assist in giving the reverse movement to the handle.

It will be noticed that the basket and buckets are made so as to be easily removable, so that all the parts may be readily cleaned or taken out for repairs or for the purpose of using the water-vessel for washing larger articles. It will be also seen that the buckets are made so that their lower surfaces or parts are in a line with the curve of the water-vessel, or nearly so, and their side portions are in a line radiating from the center of oscillation, or nearly so, and so that the upper part of the bucket is left open. The effect of this construction is that when the bucket is thrown toward the top of the vessel the water is thrown forward and out onto the dishes more readily.

I claim as my invention—

1. A dish-washing machine consisting of the water-vessel and a removable basket, in combination with a removable vibrating frame provided with buckets, an operating-handle fixedly secured to said frame, and stops arranged in the path of the handle to limit its movements each way, as and for the purposes described.

2. In a dish-washing machine, the combination of a water-vessel, a removable basket, and a removable vibrating bucket-frame provided with two angular buckets having the upper portions open, and spring-stops for limiting and cushioning the vibrating movements of said frame each way, substantially as and for the purposes described.

HORACE B. SCOVILLE.

Witnesses:
JENNIE M. CALDWELL,
E. T. DORLAND.